United States Patent [19]

Leason

[11] 4,414,172

[45] Nov. 8, 1983

[54] PROCESS AND APPARATUS FOR SEALING A PLURALITY OF FILTER ELEMENTS

[75] Inventor: Hayden L. Leason, Palmas Del Mar, P.R.

[73] Assignee: Filtertek, Inc., Hebron, Ill.

[21] Appl. No.: 380,565

[22] Filed: May 21, 1982

[51] Int. Cl.³ .......................... B29C 6/04; B29C 5/00; B29D 31/00
[52] U.S. Cl. .................................. 264/255; 264/258; 264/262; 264/267
[58] Field of Search ............... 264/261, 262, 263, 255, 264/257, 258, 273, 275, 277, 278, 279, 267; 425/110, 116, 123, 125, 127, 128, 129 R

[56] References Cited

U.S. PATENT DOCUMENTS

| | | | |
|---|---|---|---|
| 3,148,223 | 9/1964 | Gits | 264/161 |
| 3,872,576 | 3/1975 | Mott | 210/445 |
| 3,954,625 | 5/1976 | Michalski | 210/451 |
| 4,113,627 | 9/1978 | Leason | 264/255 |
| 4,159,954 | 7/1979 | Gangemi | 210/489 |

Primary Examiner—Willard E. Hoag
Attorney, Agent, or Firm—Hume, Clement, Brinks, Willian & Olds, Ltd.

[57] ABSTRACT

The present invention relates to a process and apparatus for making sealed filter units which include a plurality of filter elements. The apparatus includes a lower mold half for supporting a filter element support and a retractable locater member. The retractable locater member includes a reduced cross-sectional notched portion which projects above the lower mold half. When retracted into the lower mold half, the notched portion in conjunction with the upper and lower mold halves forms a cavity along the outer and upper peripheral edges of the filter elements and support. A thermoplastic material is injected into this cavity to capture the filter elements to the filter element support.

14 Claims, 6 Drawing Figures

PROCESS AND APPARATUS FOR SEALING A PLURALITY OF FILTER ELEMENTS

BACKGROUND OF THE INVENTION

The present invention relates to a process and apparatus for making sealed filter units. In particular the present invention relates to an apparatus and process for sealing a plurality of filter elements to a filter element assembly so that the integral filter element assembly may be combined with a housing member to form a sealed filter unit.

Molded plastic filters and filter units are well known and enjoy a wide use and general acceptance in a variety of industries. The function of such units is to remove contaminants from liquid or gaseous materials which flow therethrough. These units are particularly important in the medical industry wherein they are used to filter bacteria, gasses and other contaminants from solutions before being introduced into the human blood stream. In such critical applications it is imperative that the filtrate not bypass the filtering elements. It is necessary, therefore, to provide a leakproof filter unit so as to prevent leakage around the filter element and to prevent possible bacteria contamination from outside the assembly.

Typically, the filter units used to filter intravenous solutions comprise a two-part housing with an internally disposed filter sandwiched therebetween. Typically, the molding process for these filter units entails, first the molding of the filter element support member, which is usually the outlet housing member of the filter unit. Once the filter element support member has been molded, through injection molding, a filter element is usually located on the outlet housing member over the outlet opening. Once so located, either an overmold is molded over the outer peripheral edge of the filter element and the outlet housing member, encapsulating the filter element within the outlet housing member, or the inlet housing element is positioned over the outlet housing member sandwiching the filter element therebetween. The inlet housing member and outlet housing member are then sealed together by any of a variety of methods including, pressure clamping, heat sealing, ultrasonic welding, or the use of an overmold band. See, e.g., U.S. Pat. No. 4,113,627.

It is especially critical in the medical industry to maintain a leakproof seal between the filter element and the filter housing members. Thus, it is essential that the filter elements are properly positioned on the housing member to insure that the fluid which is being filtered does not bypass the filter elements. When only one filter element is to be positioned on the housing member, this operation can usually be accomplished without much problem.

When a plurality of filter elements are to be positioned on a housing member, not only is the problem of properly locating the filter elements on the housing member compounded, but also a second problem of aligning the filter elements with each other is created. With regard to this problem, it should be noted that the majority of filter elements used in the medical industry are not flat pieces of membrane, but usually have a textured, uneven surface. Thus, for example, when seven to nine filter membranes are stacked, they have a height of approximately one-eighth to one-sixth of an inch.

Furthermore, not only is there a problem of positioning and aligning a plurality of filter elements on the housing member, once they are so aligned their lateral movement with respect to the filter element support and each other must be prevented so that they may be secured to the housing member.

Thus, there is a need for a new process and apparatus which will properly locate and align a plurality of filter elements on a filter element support and maintain that location while the filter elements are sealed into an integral filter element assembly.

SUMMARY OF THE INVENTION

The apparatus of this invention includes a lower mold half for supporting a thermoplastic filter element support and retractable locater members. The retractable locater members function to accurately locate and align a plurality of filter elements on the filter element support. A corresponding upper mold half, in conjunction with the lower mold half, defines a cavity along the outer peripheral edges of the filter elements and the support. A thermoplastic resin is injected into this cavity to seal the filter elements to the support.

A method is therefore provided by which a filter element support is supported on a lower mold half and a plurality of filter elements are then located and aligned on the filter element support by retractable locater means which project above the lower mold half. A mating upper mold half is then positioned above the filter elements and support causing the retractable locater means to retract. A thermoplastic resin is then injected into a cavity defined by the upper and lower mold halves along the outer peripheral edge of the filter elements and support, creating an integral filter element assembly. Typically the filter element support is an outlet housing member of the filter unit.

In a preferred embodiment, the retractable locater members are notched and have a stepped configuration. The notched portion defines a part of the cavity. The retractable locater members may be spring loaded and thereby extend from the lower mold half automatically when the mold halves are not in contact. The mold halves may also be constructed so that the upper mold half contacts and secures in position the filter elements before or simultaneous to the time the retractable locater members have been retracted.

In a most preferred embodiment, the retractable locater member is a sleeve. The retractable locater members may also be a series of pins or partial sleeves.

Accordingly, an advantage of the present invention is to provide an apparatus and process which will seal a plurality of filter elements to a filter element support.

A further advantage of the invention is to provide an apparatus which will accurately locate and align a plurality of filter elements on an outlet housing member over the outlet aperture.

Another advantage of the invention is to provide an apparatus which will locate and align a plurality of filter elements on a filter element support and retract once the filter elements are so positioned.

A further advantage of the invention is to provide a more efficient method for positioning and sealing a plurality of filter elements to a filter element support.

Additional features and advantages are described in, and will be apparent from, the detailed description of the preferred embodiments and from the drawings.

DETAILED DESCRIPTION OF THE PREFERRED EMBODIMENTS

Figure 1:
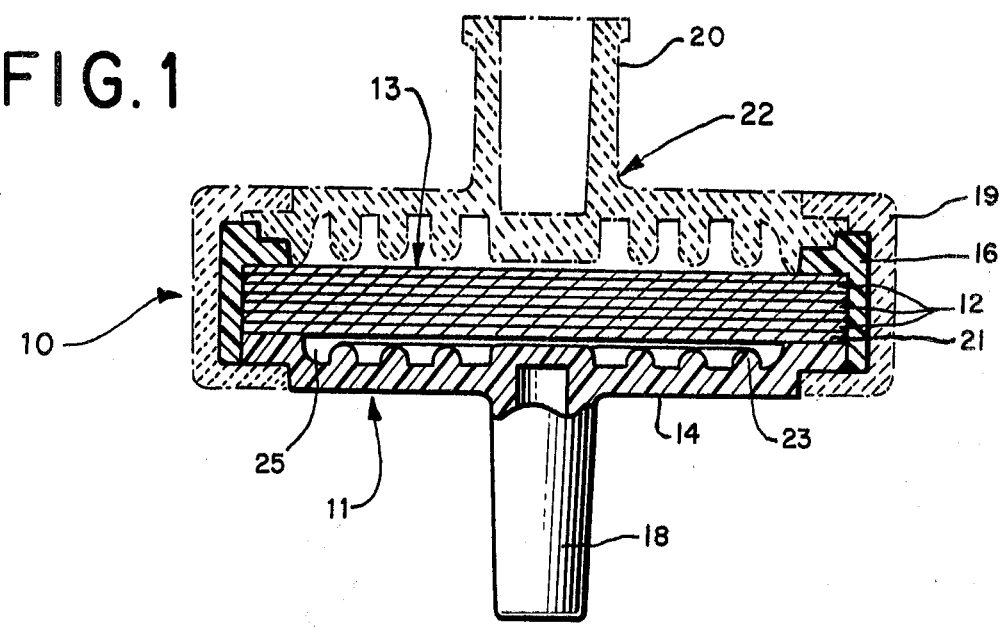
FIG. 1 is a cross-sectional view of a filter unit constructed in accordance with the process and apparatus of the present invention.

FIG. 1 is a cross-sectional view of a circular filter unit 10 constructed in accordance with the process and apparatus of the present invention. The filter unit 10 includes an integral filter element assembly generally indicated by numeral 11 and an inlet housing member 22. Integral filter element assembly 11 includes an outlet housing member 14, a plurality of filter elements 12 and a filter overmold 16. Extending outwardly from the body of the outlet housing member 14 is an outlet opening 18, which is in flow communication with the filter zone 13. The outlet opening 18, in conjunction with an inlet opening 20 in inlet housing member 22, forms a fluid passageway through the filter unit 10. To this end, housing inlet member 22 is sealed to the integral filter element assembly 11 by a thermoplastic or elastomeric filter unit overmold 19.

The filter elements 12 are supported upon the outlet housing member 14 on rim 21, above the outlet opening 18. When so positioned, fluid which passes through inlet opening 22 must pass through the filter elements 12 before exiting through the outlet opening 18. In order to prevent the fluid which is to be filtered from bypassing the filter elements 12, a thermoplastic filter overmold 16 seals the filter elements 12 to the outlet housing member 14, specifically to the rim 21. In order to better support the filter elements 12, the outlet housing member 14 includes a plurality of rib members 23, which circumscribe a recessed portion 25 of the outlet housing member 14.

Figure 2:
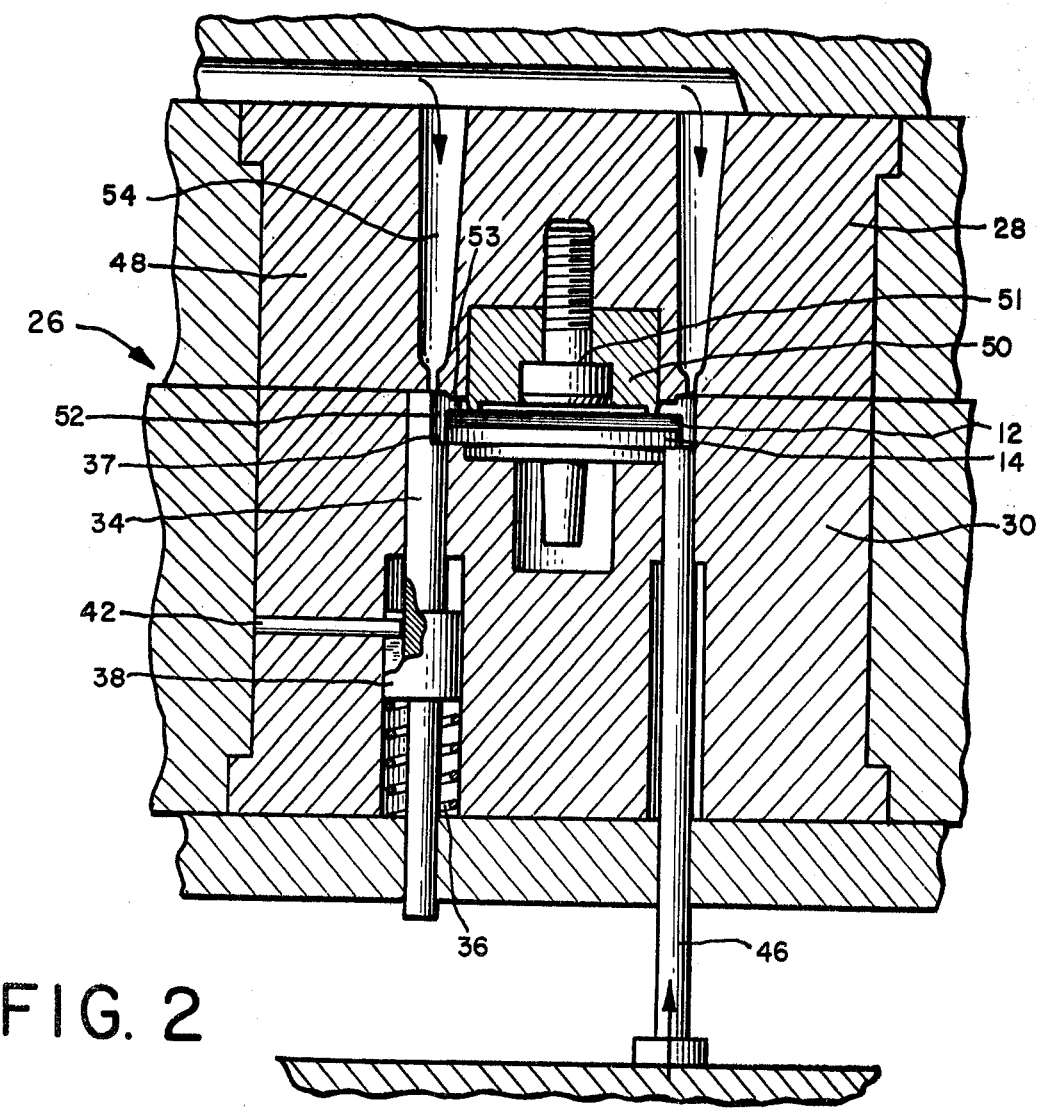
FIG. 2 is a cross-sectional view of a preferred embodiment of the molding apparatus.

Referring now to FIG. 2, a molding apparatus 26 for molding the filter unit 10 is shown. The molding apparatus 26 includes an upper mold half 28 and a lower mold half 30. As shown more specifically in FIG. 3, the lower mold half 30 includes a stepped bore 32. Stepped bore 32 conforms to the shape of outlet housing member 14 so that the outlet housing member 14 may be positioned within the stepped bore 32. This construction allows one to easily position an outlet housing member 14 within the lower mold half 30.

Figure 4:
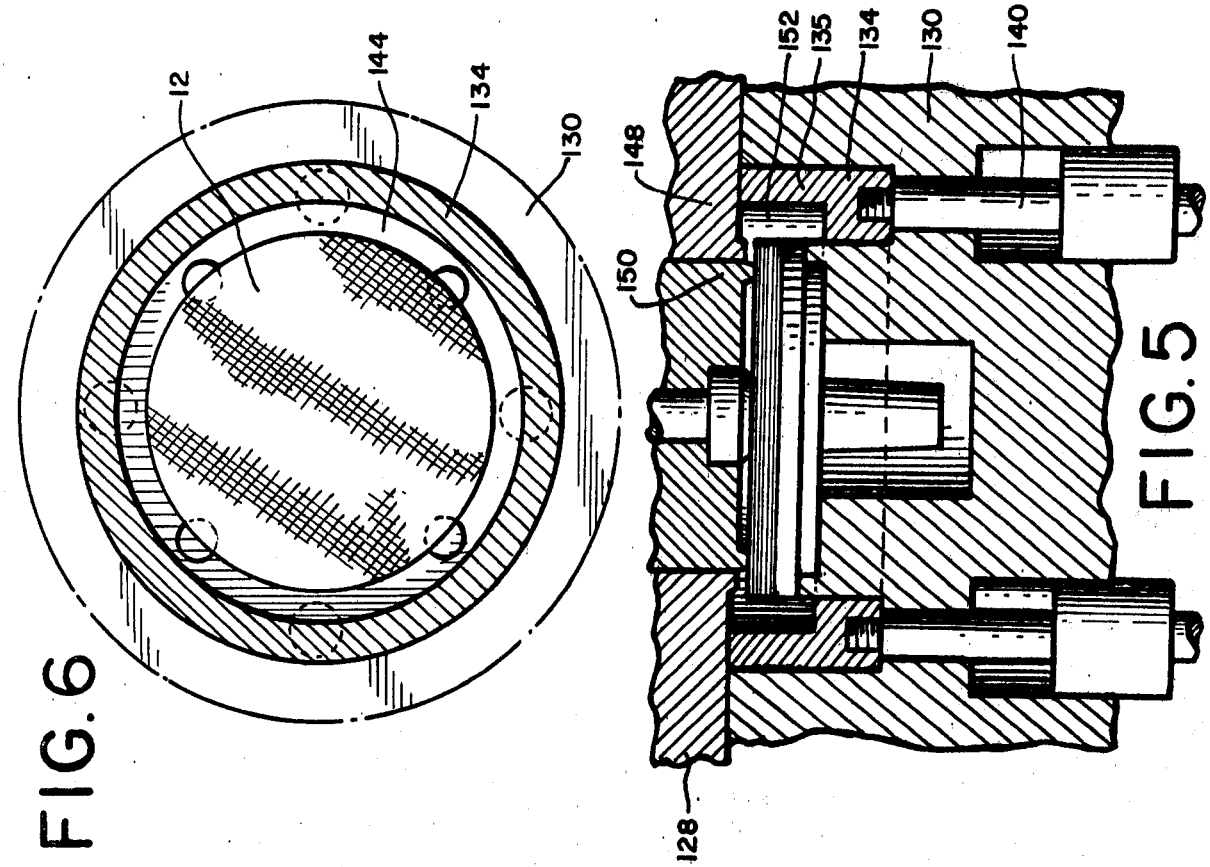
FIG. 4 is a top elevation view of a section of the lower mold half of FIG. 2.
Figure 3:
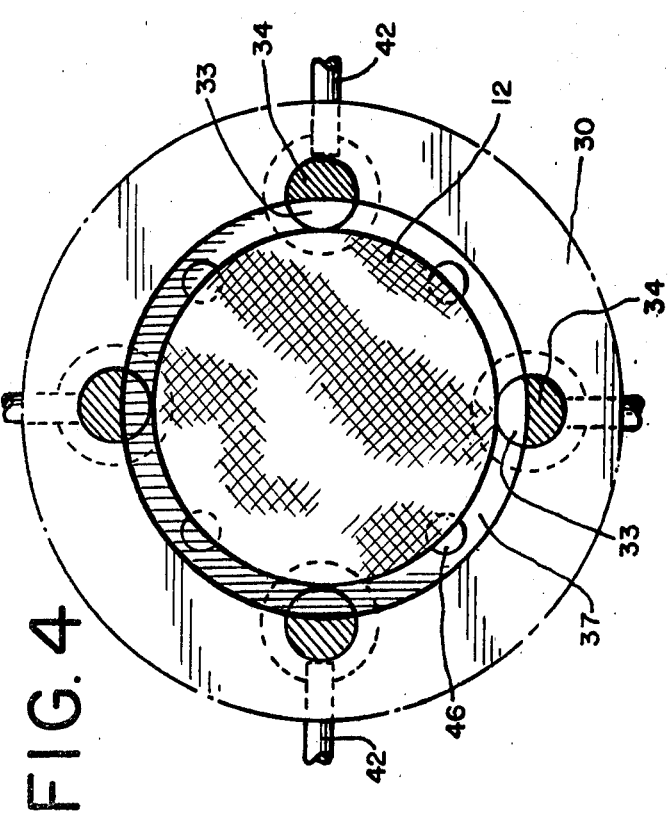
FIG. 3 is a cross-sectional view of the lower mold half of FIG. 2.

The lower mold half 30 also includes retractable locater members such as pins 34. The retractable locater pins 34 project above the lower mold half 30 when the upper mold half 28 is not in contact with the lower mold half 30. As shown in FIG. 4, the retractable locater pins 34 project above the lower mold half 30 from four equidistant points so that they surround at least a portion of the outer peripheral edge of the outer housing member 14 when it is received within the stepped bore 32. As shown in FIG. 3, the retractable locater pins 34 are notched 33, as will be defined later, and therefore have a stepped configuration.

The retractable locater members 34 are spring loaded as shown in FIG. 2. To this end, a spring 36 urges the larger cross-sectional portion 38 of the retractable locater pins 34 upward. Therefore, when the upper mold half 28 does not contact the lower mold half 30, retractable locater pins 34 project above the lower mold half 30. The larger cross-sectional portion 38 is also slotted and fitted with a key 42. The key 42 prevents the retractable locater pins 34 from rotating.

The retractable locater pins 34 function to properly position the filter elements 12 on the outlet housing member 14. In order to position the filter elements 12 on the outlet housing member 14, the operator merely places or drops the filter elements within the tubular area defined by the upwardly extending retractable locater pins 34. Because of their placement, the retractable locater pins 34 locate and properly align the filter elements 12 over the rim member 21 of the outlet housing member 14. Once the filter elements 12 are properly positioned on the outlet housing member 14 the retractable locater pins 34 cooperate to prevent lateral movement of the filter elements 12 with respect to each other and to the outlet housing member. Once the filter elements 12 have been aligned to the outlet housing member 14 they may be sealed to form an integral filter unit 11.

Referring now to FIG. 2, upper mold half 28 includes body member 48 and core insert 50. As the upper mold half 28 is moved toward the lower mold half 30, the body member 48 contacts projecting reduced diameter portions 35 of the retractable locater pins 34. The body member 48 pushes the reduced diameter portions 35 of the retractable locater pins 34 downwardly into the lower mold half 30 as the upper mold half 28 closes over lower mold half 30. As shown in FIG. 4, because the retractable locater pins 34 are notched 33, when the projecting reduced diameter portions 35 of the locater pins are retracted into the lower mold half 30 they form at least a portion of a channel 37 around the filter element 12 and outlet housing member 14.

When the mold halves are in place, the core insert 50 functions to press the filter elements 12 against the outlet housing member 14. To this end, the core insert contacts the filter elements 12 near the outer peripheral edge of the filter elements 12 forcing the filter elements against the rim 21 of the outlet housing member 14. The core insert 50 thereby prevents lateral movement of the filter elements 12 with respect to the outlet housing member 14 when the mold halves 28, 30 are closed.

The core insert 50 is secured to the body member 48 of the upper mold half 28 by a core insert screw 51. When so positioned, the core insert 50 projects downwardly from the uppr mold half 28 a greater distance than the body member 48 of the upper mold half 28. This construction insures that the core insert 50 contacts and secures the filter elements 12 to the outlet housing member 14 before or simultaneously to the time when the reduced diameter portions 35 of the retractable locater pins 34 have been retracted into the lower mold half 30. The core insert 50 and retractable locater pins 34 therefore function to prevent the lateral movement of the filter elements 12 with respect to the outlet housing member 14 and each other.

As shown in FIG. 2, when the mold unit 26 is closed, an annular cavity 52 is formed along the outer and upper peripheral edges of the outer housing member 14 and filter elements 12. The cavity 52 is defined by the notched portions 33 of the retractable locater pins 34, stepped bore 32, core insert 50 and body member 48. To this end, the notched portions 33 of the retractable locater pins 34 and stepped bore 32 form a channel 37 which circumscribes the outer peripheral edge of the outer housing member 14 and filter elements 12. Core insert 50 in conjunction with body member 48, define a portion 53 of channel 52 which circumscribes the upper peripheral edge of the outer housing member 14 and filter elements 12. Thus the retractable locater pins 34, stepped bore 32, core insert 50 and body member 48 create cavity 52 which in turn defines overmold 16.

Located in the upper mold half 28, above the cavity 52 are mold injector sprues 54. Mold injector sprues 54 allow for the injection of a thermoplastic material into cavity 52. Thus, when the mold unit 26 is closed, a thermoplastic material may be injected into cavity 52, capturing the filter elements 12 to the outlet housing member 14.

After a thermoplastic material has been injected into cavity 52 the mold apparatus 26 is allowed to cool. Once cooled the injected thermoplastic material forms the filter overmold 16, which seals the filter elements 12 to the outlet housing member 14 creating an integral filter element assembly 11.

The lower mold 30 also includes ejector pins 46. Once the filter overmold 16 has sealed the filter elements 12 to the outlet housing member 14, the ejector pins 46 facilitate the removal of the integral filter element assembly 11 from the stepped bore 32.

Once the integral filter element assembly 11 has been molded it may be sealed to the inlet half of filter unit 10 by molding a filter unit overmold 19 around the peripheral edge of the inlet and outlet halves, or by some other means known in the art to form a sealed filter unit 10 with a plurality of filter elements 12. See, e.g., U.S. Pat. No. 4,113,627.

Figure 6:
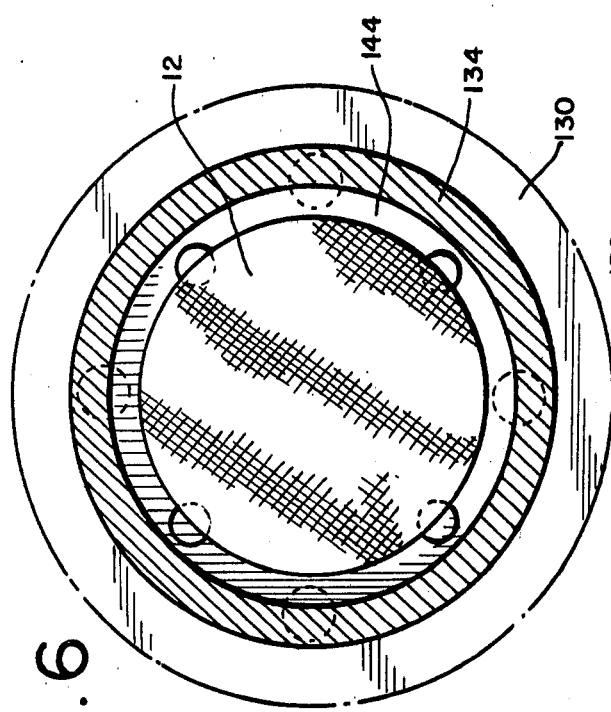
FIG. 6 is a top elevation view of a section of the lower mold half of FIG. 5.
Figure 5:
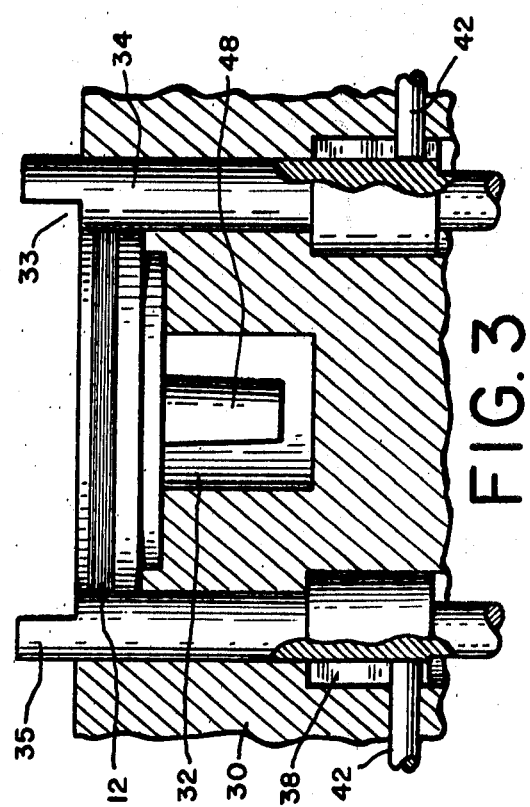
FIG. 5 is a cross-sectional view of another preferred embodiment of the molding apparatus.

In a most preferred embodiment, as shown in FIG. 5, the retractable locater member is a two stepped sleeve 134. Similarly to the retractable locater pins 34, the two stepped sleeve 134 is also notched with a reduced cross-sectional portion 135 cut away to define a portion of the overmold cavity 152. As shown in FIG. 6, the reduced cross-sectional portion 135 of the two stepped sleeve 134 forms a channel 144, which circumscribes the outer peripheral edge of the filter elements 12 and outlet housing member 14 when it is retracted into the lower mold half 130.

Referring back to FIG. 5, when the reduced cross-sectional portion 135 of the two stepped sleeve 134 projects above the lower mold half 130 it functions as a tube to guide the filter elements 12 onto the outlet housing member 14. Because of its design, the two stepped sleeve 134 facilitates the positioning of the filter elements 12 on the outlet housing member 14 while at the same time preventing the lateral movement of the filter elements 12 with respect to each other and the outlet housing member 14.

The two stepped sleeve 134 is also spring loaded. To this end the two stepped sleeve 134 is connected to rod members 140 which are urged upwardly by springs (not shown). Therefore, when the mold halves 128, 130 are opened, the reduced cross-sectional portion 135 of the two sleeve 134 projects above the lower mold half 130.

Because the upper mold half 128 is identical in this embodiment to the upper mold half 28 previously described, when the mold halves are closed, the two stepped sleeve 134, core insert 150 and body member 148 define a cavity 152 along the outer and upper peripheral edges of the filter elements 12 and outlet housing member 14. Accordingly, once the filter elements 12 have been positioned on the outlet housing member 14 and the mold halves are closed, a thermoplastic resin is injected into this cavity to form overmold 16, creating integral filter element assembly 11.

It should be noted that while the two stepped sleeve 134 in FIG. 6 is shown as a single member, it may comprise two or more segments.

It should be understood that various changes and modifications to the preferred embodiments described herein will be apparent to those skilled in the art. Such changes and modifications can be made without departing from the spirit and scope of the present invention and without diminishing its attendant advantages. It is therefore, intended that such changes and modifications be covered by the following claims.

I claim:

1. A method for sealing a plurality of filter elements to a thermoplastic support having at least one aperture for the passage of a fluid, comprising the steps of:
   supporting the thermoplastic support on a lower mold half;
   aligning a plurality of filter elements over the aperture and the adjacent surface portions of the support, by utilizing a retractable locater projecting from the lower mold half;
   placing an upper mold half over the lower mold half, the upper mold half having portions which contact and apply pressure to the filter elements between the periphery of the filter elements and the portion of the elements above the aperture to hold the filter elements in position on the support, the upper mold half having portions which engage the retractable locater causing it to retract into said lower mold half as the upper mold half contacts the filter elements leaving an injection channel adjacent said elements;
   injection molding a thermoplastic material in said channel being formed by the upper mold half, the lower mold half, and the retractable locater, to form an integral seal between the support and the filter elements; and
   separating the mold halves and ejecting the support and its integral filter element.

2. The method of claim 1 wherein the retractable locater comprises a series of pins.

3. The method of claim 1 wherein said retractable locater is a two stepped sleeve.

4. A method for sealing a plurality of filter elements to a thermoplastic support comprising:
   molding a thermoplastic support for the filter elements between lower and upper mold halves, the support having at least one aperture for the passage of a fluid, the aperture surrounded, on the filter side, by a flat rim;
   removing the upper mold half to expose the support and its rim;
   aligning a plurality of filter elements over the aperture and the rim by utilizing a retractable locater means, the retractable locater means extending above the lower mold half and having surfaces which define a portion of an injection channel adjacent said elements upon retraction;
   placing a second upper mold half over the lower mold half, the support and the filter elements, the second mold half having portions which contact and apply pressure to the filter elements between the periphery of the filter elements and the portion of the filter elements above the aperture;

injection molding a compatible thermoplastic material into said channel formed between the upper and lower mold halves along the peripheral edge of the filter elements and support, to form an integral seal between the support and the filter elements; and separating the mold halves and ejecting the support and its integral filter elements.

5. The method of claim 4 including the steps of causing the retractable locater means to retract as the second upper mold half contacts the filter elements.

6. The method of claim 5 wherein the retractable locater means comprises a series of notched pins.

7. The method of claim 5 wherein the retractable locater means is a two stepped sleeve.

8. An apparatus for hermetically sealing a plurality of filter elements to a thermoplastic support having at least one aperture for the passage of a fluid, comprising:

an upper mold half;

a lower mold half, the lower mold half having means for supporting a thermoplastic support and including retractable locater means for locating and aligning a plurality of filter elements on the filter elements support;

said retractable locater means having surfaces which define a portion of an injection channel; and means for injecting a thermoplastic resin into said injection channel.

9. The apparatus of claim 8 wherein:

the upper mold includes means for securing the filter elements against the thermoplastic support when the upper mold is placed over the thermoplastic support, and means for causing the retractable locater means to retract into the lower mold.

10. The apparatus of claims 9 or 8 wherein the retractable locater means comprises a series of notched pins.

11. The apparatus of claims 9 or 10 wherein the retractable locater means is a two stepped sleeve.

12. An apparatus for hermetically sealing a plurality of filter elements to a filter element support, comprising:

a lower mold half, the lower mold half including, means for supporting the filter element support and a retractable locater member for locating and aligning a plurality of filter elements on the filter element support, the retractable locater member having a reduced cross-sectional portion which projects above the lower mold half the retractable locater member defining a portion of an injection channel;

an upper mold half, the upper mold half including means for contacting and applying pressure to the filter elements near the peripheral edge of the filter element support as the retractable locater member retracts; and means for injecting a thermoplastic material into a cavity defined by the upper mold half, reduced cross-sectional portion of the retractable locater member and lower mold half along an upper and outer peripheral edge of the support and the filter elements to form an overmold which seals the filter elements to the support.

13. The apparatus of claim 12 wherein the retractable filter locater is a two stepped sleeve.

14. The apparatus of claim 13 wherein the retractable filter locater a series of stepped pins.

* * * * *